US006774815B2

(12) United States Patent
Shima et al.

(10) Patent No.: US 6,774,815 B2
(45) Date of Patent: Aug. 10, 2004

(54) ON-ROAD FACILITY FAULT INFORMATION COMMUNICATION APPARATUS

(75) Inventors: Takeshi Shima, Hitachi (JP); Kazunori Takahashi, Hitachi (JP); Tetsuaki Kondou, Hitachinaka (JP); Norihiro Nakajima, Hitachi (JP); Ryo Yumiba, Hitachi (JP); Morihiro Tanaka, Fuchu (JP); Kazuyuki Nakagawa, Tokyo (JP); Takahiro Yamanashi, Susono (JP); Keisaku Nozaki, Kadoma (JP)

(73) Assignee: National Institute for Land and Infrastructure Management, Ministry of Land, Infrastructure and Transportation, Tsukuba (JP)

( * ) Notice: Subject to any disclaimer, the term of this patent is extended or adjusted under 35 U.S.C. 154(b) by 219 days.

(21) Appl. No.: 10/058,452

(22) Filed: Jan. 28, 2002

(65) Prior Publication Data

US 2002/0145539 A1 Oct. 10, 2002

(30) Foreign Application Priority Data

Mar. 8, 2001 (JP) ........................................ 2001-064166

(51) Int. Cl.$^7$ ............................ G08G 7/00; G08G 1/09; G08G 7/096; G01L 22/00
(52) U.S. Cl. ...................... 340/905; 340/901; 340/928; 340/932; 340/933; 701/23; 701/24; 701/25; 701/26; 701/27; 701/28
(58) Field of Search ................................. 340/905, 933, 340/901, 928, 932; 701/23–28, 93–98, 117–119

(56) References Cited

U.S. PATENT DOCUMENTS 3,899,671 A * 8/1975 Stover ......................... 455/524
5,369,591 A     11/1994 Broxmeyer
5,636,203 A *  6/1997 Shah .......................... 370/244
5,666,109 A *  9/1997 Fukui et al. ................. 340/905
6,360,171 B1 *  3/2002 Miyamoto et al. .......... 701/301
6,459,991 B1 * 10/2002 Takiguchi et al. .......... 701/301

FOREIGN PATENT DOCUMENTS

EP         1096460 A2 *  5/2001  .......... G08G/01/16
JP         09 326744       12/1997
JP         2000 182188      6/2000

OTHER PUBLICATIONS

Abstract 02251565.4.

* cited by examiner

Primary Examiner—Jeffery Hofsass
Assistant Examiner—Lam Pham
(74) Attorney, Agent, or Firm—Flynn, Thiel, Boutell & Tanis, P.C.

(57) ABSTRACT

In an advanced-cruise-assist highway system, an AHS center facility, which is an upper facility for on-road facilities, periodically receives diagnostic information from the on-road facilities, and when it is determined that any on-road facility is in the faulty state, communicates the information that the on-road facility is in the faulty state to on-road facilities upstream from the faulty on-road facility, and the on-road facilities having received the information on the fault in the downstream on-road facility communicates the information that the downstream on-road facility is in the faulty state via a road-to-vehicle communication facility to AHS vehicles having the possibility of entering a zone under control by the faulty on-road facility. Further the information that the downstream on-road facility is in the faulty state is displayed on information board which can be recognize by vehicles having the possibility of entering a zone under control by the faulty on-road facility.

4 Claims, 2 Drawing Sheets

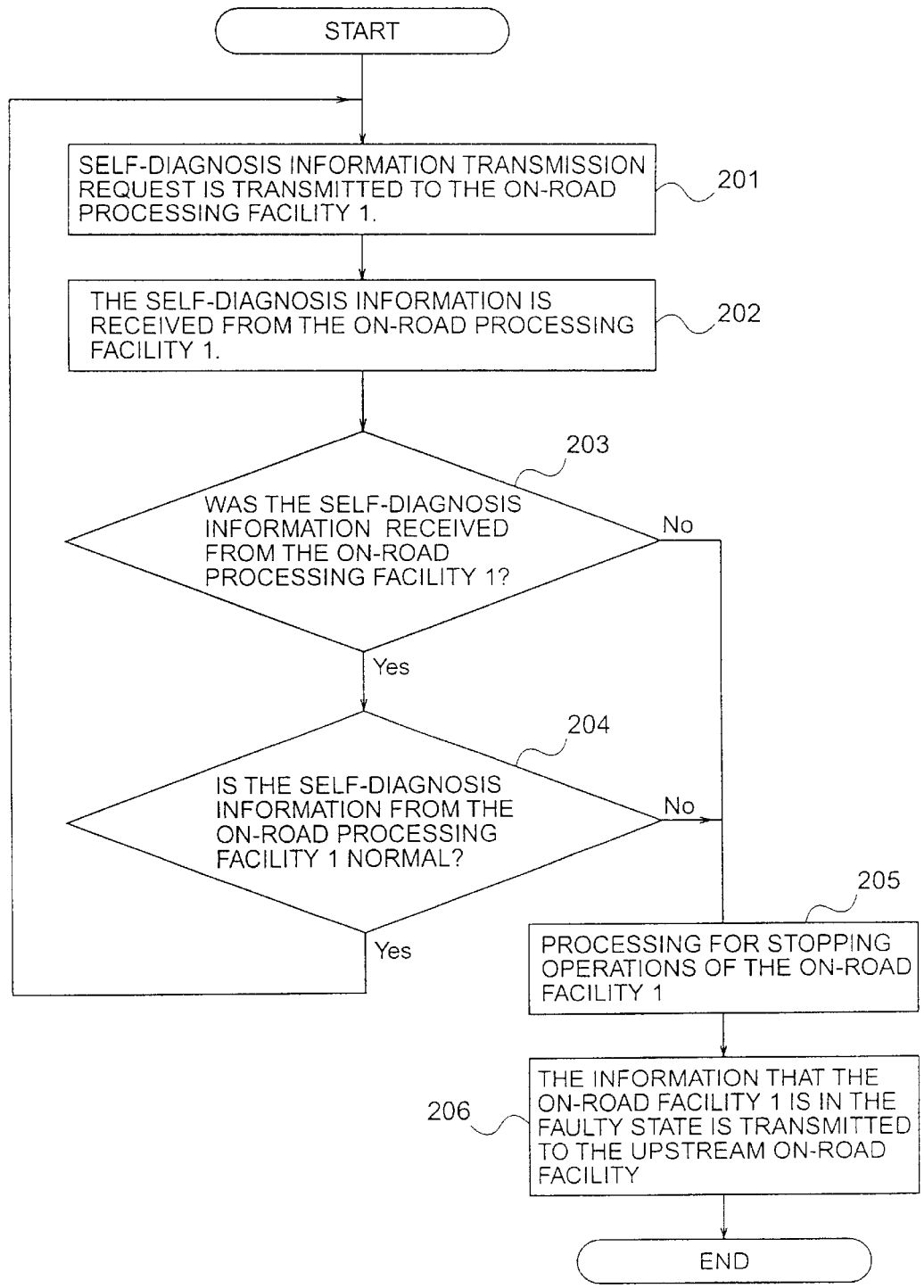

… (1)

ON-ROAD FACILITY FAULT INFORMATION COMMUNICATION APPARATUS

FIELD OF THE INVENTION

The present invention relates to an on-road facility fault information communication apparatus in an advanced-cruise-assist highway system (AHS) for delivering information for supporting safe and smooth traveling to each driver.

BACKGROUND OF THE INVENTION

The conventional type of advanced-cruise-assist highway system (described as AHS hereinafter) generally comprises a road situation detection facility for detecting vehicles or obstacles on a road, a road situation detection facility for detecting surface situations of a road, a road situation detection facility, an on-road processing unit for preparing information for supporting safe travel of each car driver by using the information detected by the road surface situation detection facility, a road-to-vehicle communication facility for performing radio communication with vehicles each having a radio communication unit loaded therein (described as AHS vehicle hereinafter), and an information display facility for displaying information for supporting safe travel to each driver by using a display board provided on a road. The possibility of detecting, when a fault occurs in any of the facilities, the fault with a self-diagnosis function or a mutual diagnosis function and reporting information on the fault to an AHS center facility, which is an upper facility for the AHS vehicles or on-road facilities has been examined.

In the system as described above, however, when a fault occurs in the road-to-vehicle communication facility and a system fault can not be communicated to the AHS vehicles, or when a fault occurs in the information display facility and a system fault can not be displayed on the information drivers of vehicles running on the road.

OBJECT AND SUMMARY OF THE INVENTION

In the present invention, the AHS center facility, which is an upper facility for on-road facilities, periodically obtains diagnostic information for the on-road facilities, and when a fault has occurred in any of the on-road facilities in the downstream therefrom, the AHS center facility communicates information that the on-road facility in the downstream is faulty to on-road facilities in the upstream direction from the faulty facility. The on-road facility having received information concerning a fault in the downstream on-road facility from the AHS center facility communicates information concerning the fault in the down-stream on-road facility to AHS vehicles which may enter a zone under control by the faulty on-road facility by using the road-to-vehicle communication facility. Further The AHS center facility is characterized in that a display indicating occurrence of the fault in the downstream on-road facility is provided on the information display board which can be recognized by the vehicles having the possibility of entering the zone under control by the faulty on-road facility.

BRIEF DESCRIPTION OF THE DRAWINGS

FIG. 2 is a flow chart showing a flow of processing performed in a on-road facility fault communication apparatus 117 in an AHS center facility 101 shown in FIG. 1.

DETAILED DESCRIPTION OF THE PREFERRED EMBODIMENT

Figure 1:
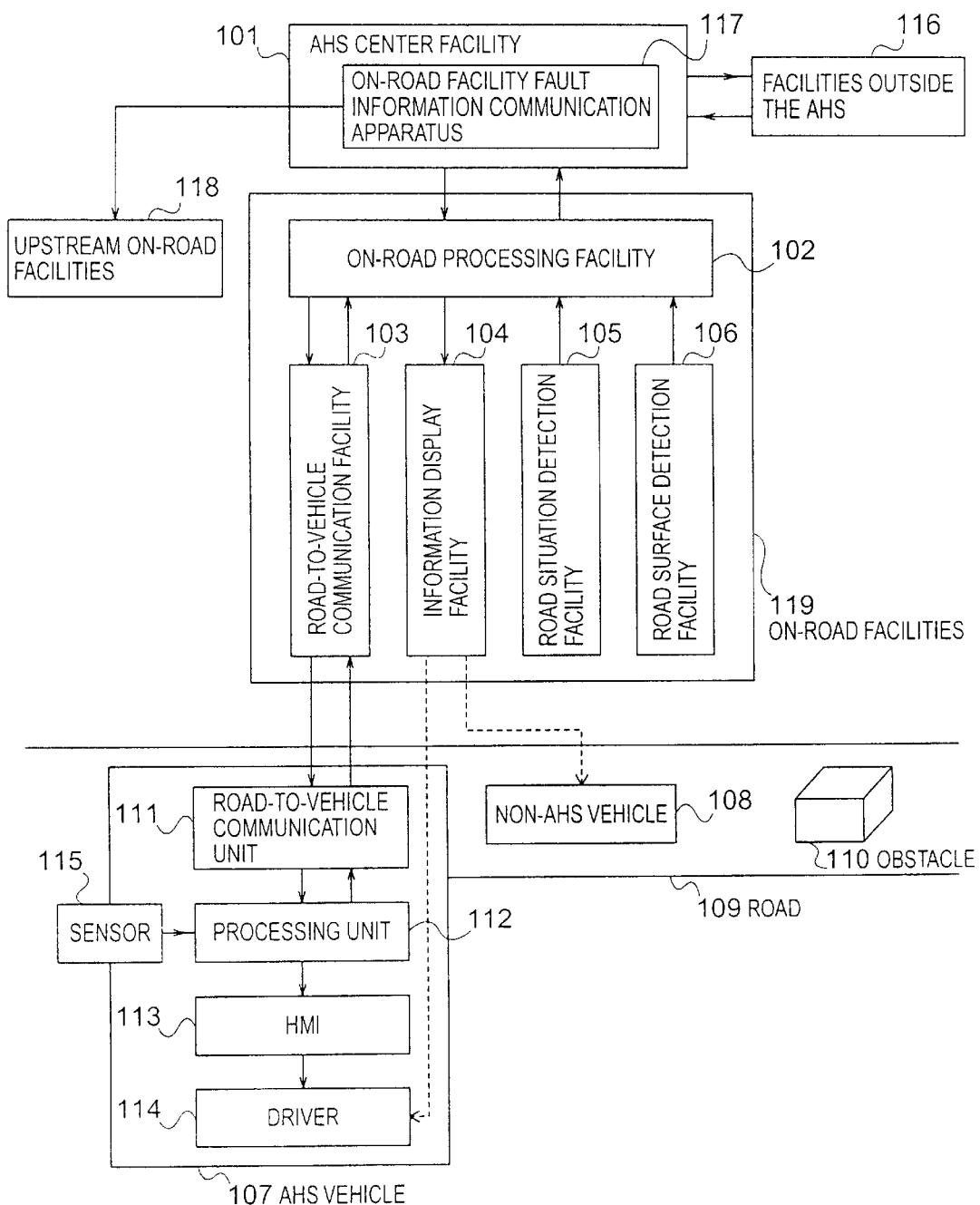
FIG. 1 is a view showing a general concept of the present invention.

An embodiment of the present invention is described below with reference to the drawings.

At first, a general concept of the present invention is described with reference to FIG. 1. FIG. 1 is a view illustrating an AHS system as a whole. On-road facilities 119 in the AHS include a road situation detection facility 105, a road surface situation detection facility 106, an on-road processing facility 102, a road-to-vehicle communication facility 103, and an information display facility 104. An AHS vehicle 107 running on a road 109 comprises a road-to-vehicle communication unit 111, a processing unit 112, and a human machine interface (described as HMI hereinafter) 113. The road-to-vehicle communication unit 111 can perform radio interactive communications with the road-to-vehicle communication facility 103 which is an antenna provided on the road, transmit data received from the road-to-vehicle communication facility 103 to the processing unit 112 and also transmits data received from the processing unit 112 to the road-to-vehicle communication facility 103.

The processing unit 112 makes a determination based on the data received from the road-to-vehicle communication unit 111 as well as on information provided from various types of sensors 115, prepares information to be delivered to drivers 114, and transmits the prepared information to the HMI 113. The processing unit 112 also transmits data from various sensors loaded in vehicles or data processed in the processing unit 112 to the road-to-vehicle communication unit 111.

The HMI 113 converts the data received from the processing unit 112 to those recognizable by the driver 114, and delivers the converted data to the driver 114. Herein it is assumed that the driver 114 drives a car according to the information delivered from the HMI 113. Namely the delivered information is that for supporting safe travel of the driver 114, and includes information concerning obstacles existing in a forward invisible zone, information concerning stopped vehicles and an end of an array of tied-up vehicles, information concerning vehicles which may enter a blind cross and collide to each other there, and information concerning vehicles running in an opposite direction when turning to the right at a cross.

The road-to-vehicle communication facility 103 transmits the data received from the on-road processing facility 102 to the AHS vehicle 107 through a radio system, and also transmits the data received from the AHS vehicle 107 to the on-road processing facility 102. The data transmitted to the AHS vehicle 107 is information for supporting safe travel of the driver 114 for the AHS vehicle 107, and includes information concerning obstacles existing in a forward invisible zone, information concerning stopped vehicles and an end of an array of tied-up vehicles, information concerning vehicles which may enter a blind cross and collide to each other there, and information concerning vehicles running straight in an opposite direction when turning to the right at a cross. Further the data received from the AHS vehicle 107 includes data from various types of sensors loaded in vehicles, data processed by the processing unit 112 in the AHS vehicle 107, and data such as a position and a velocity of the AHS vehicle 107.

The information display facility 104 displays the data received from the on-road processing facility 102 on an information display board provided on a road. Contents of the information displayed on this information display board includes information for supporting safe travel of a driver of a non-AHS vehicle 108, information concerning obstacles existing in a forward invisible section, stopped vehicles and an and of an array of tied-up vehicles, information concerning vehicles which may enter a blind cross and collide to each other there, and information concerning vehicles running straight in an opposite direction when turning to the right at a cross. Herein the non-AHS vehicle 108 indicates a vehicle not having the road-to-vehicle communication unit 111, processing unit 112, and HMI 113 which are to be loaded in the AHS vehicle 107.

The road situation detection facility 105 detects a position, a velocity, and a length of the AHS vehicle 107 as well as of the non-AHS vehicle 108, and also measures a position and a size of each obstacle 110 existing on the road, and transmits the measured data to the on-road processing facility 102. The road situation detection facility 105 is realized with a visual light camera, an infrared ray camera, a mili-wave sensor or the like. The road surface situation detection facility 106 measures a situation of a surface of a road 109, and transmits the measured data to the on-road processing facility 102. The measured data is information concerning dryness, wetness, and freeze on a road surface which give influences to travel of vehicles. The road surface situation detection facility 106 is realized with a visual ray camera, an infrared ray camera, a laser radar, an electric wave emission type of sensor or the like.

The on-road processing facility 102 prepares information for supporting safe travel of drivers of the AHS vehicle 107 and the non-AHS vehicle 108 from the data received from the road situation detection facility 105 as well as from the road surface detection facility 106. The prepared information includes information concerning obstacles existing in a forward invisible zone, information concerning stopped vehicles and an end of an array of tied-up vehicles, information concerning vehicles which may enter a blind cross and collide to each other there, and information concerning vehicles running straight in an opposite direction when turning to the right at a cross. The prepared information is transmitted to the road-to-vehicle communication facility 103 as well as to the information display facility 104. Further the on-road processing facility 102 receives the information transmitted from the road-to-vehicle communication facility 103. The received data is those transmitted from the AHS vehicle 107 and includes information such as a position and a velocity of the AHS vehicle detected by various sensors 115 loaded in the AHS vehicle. Further, the on-road processing facility 102 can transact data with the AHS center facility 101 which is an upper facility for the on-road facility 119. The data transmitted to the AHS center facility 101 includes log data processed by the on-road processing facility 102, while the data received from the AHS center facility 101 includes data for starting or stopping operation of the system.

The AHS center facility 101 controls the on-road facilities 119 (including the road situation detection facility 105, road surface situation detection facility 106, road-to-vehicle communication facility 103, and information display facility 104) which are facilities for supporting safe travel of drivers of the AHS vehicle 107 and the non-AHS vehicle 108, and start or stop operations of the on-road facilities 119 in the remote mode. The AHS center facility 101 controls a plurality of on-road facilities 119. Further the AHS center facility 101 transact data with facilities 116 outside the AHS for maintaining consistency with the facilities outside the AHS. Each facility included in the on-road facilities 119 can recognize its own fault with the self-diagnosis function as well as with the mutual diagnosis function.

The on-road facility fault communication apparatus 117 in an AHS center facility 101 periodically transacts diagnostic information for the on-road facilities 119 with the on-road processing facility 102, and, when it is determined that a fault has occurred in any of the on-road facilities 119, stops operation of the on-road facility 119. Further the on-road facility fault communication apparatus 117 transmits information that a fault has occurred in the down stream on-road facility 119 to the on-road facilities 118 existing in the upstream direction from the fault on-road facility 119. The upstream on-road facility 118 transmits information that the downstream on-road facility 119 is faulty with the road-to-vehicle communication facility, and the AHS vehicle 107 having received the information further delivers the information that the down stream AHS system is in the faulty state to drivers. Further the on-road facility 118 upstream from the faulty on-road facility 119 displays the information that the downstream on-road facility 119 is in the faulty state on the information display board to communicate the information to drivers.

Contents of the processing performed by the on-road facility fault communication apparatus 117 in an AHS center facility 101 shown in FIG. 1 is described below with reference to FIG. 2. FIG. 2 is a flow chart showing the process sequence performed by the on-road facility fault communication apparatus 117 in an AHS center facility 101. At first the processing for "transmission of a self-diagnosis information transmission demand to the on-road processing facility 1 in a step 201. In this processing step 201, data demanding transmission of a result of self-diagnosis in the on-road facility 1 to the AHS center facility 101 is transmitted to the on-road facility 1. Then the processing for "receiving the self-diagnosis information from the on-road facility 1" is performed in a step 202. In this processing step 202, a result of self diagnosis in the on-road facility 1 transmitted from the on-road processing facility 1 is received in response to the processing in the processing step 201. In a branching step 203, if a result of self diagnosis from the on-road processing facility 1 can be received in the previous processing step 202, the processing goes to a branching step 204. On the other hand, when a result of self diagnosis can not be received from the previous processing step 202, the processing goes to a processing step 205.

In the branching step 204, when a result of diagnosis in the on-road facility 1 received from the on-road processing facility 1 in the processing step 202 indicates that the on-road facility 1 is normal, the processing returns to the processing step 201. On the other hand, in the branching step 204, if the result of self diagnosis in the on-road facility 1 received from the on-road processing facility 1 in the processing step 202 indicates that the on-road facility 1 is abnormal, the processing goes to the processing step 205. In the processing step 205, "the processing for stopping operations of the on-road facility 1" is performed. In this step, operations of the on-road facility 1 are stopped from the AHS center facility 101 in the remote mode. In the case where no response is returned from the on-road facility 1 in the branching step 203 and the processing is shifted to this processing step 205, it indicates that the on-road facility 1 is not in the faulty state, and the possibility of an error in a communication facility between the AHS center 101 and the on-road processing facility 1 is conceivable, but the processing step 205 is executed assuming for system safety that the on-road facility can not return a response because any fault has occurred in the on-road facility 1.

Next to the processing step 205 described above, "the processing for communicating information concerning the fault in the on-road facility 1 to an upstream on-road facility 2" is executed in a processing step 206. In this processing step 206, the information that the on-road facility 1 is in the faulty state is delivered to the on-road facility 2 upstream from the on-road facility 1. In the processing step 206, when the on-road facility 2 receives the information that the downstream on-road facility 1 is in the faulty state, the on-road facility 2 transmits the information that the on-road facility is in the faulty state to the AHS vehicles 107, among the AHS vehicles to which the information can be communicated via the road-to-vehicle communication facility, which may enter a zone under control by the on-road facility 1. The AHS vehicles 107 having received the information that the on-road facility 1 is in the faulty state notice drivers of the vehicles of the information that the downstream on-road facility 1 is in the faulty state. The on-road facility 2 having received the information that the downstream on-road facility 1 is in the faulty state displays the information on the information display boards, among those under the control by the on-road facility 2, which drivers of vehicles having the possibility of entering a zone under control by the on-road facility 1 can recognize to tell the drivers that the downstream on-road facility 1 is in the faulty state.

The present invention has the configuration as described above, and provides the effect that it is possible to communicate information on a system fault to drivers even when the road-to-vehicle communication facility is faulty and can not notice AHS vehicles of the system fault, or even when an information display facility is faulty and information on the system fault can not be displayed on the information display board.

What is claimed is:

1. A travel supporting road system, comprising:

a plurality of on-road facilities spaced along a road for monitoring driving conditions of the road, generating information regarding the driving condition of the road, and delivering the generated information to a driver of one or more vehicles traveling on the road; and a center facility for communicating with and managing said plurality of on-road facilities, said center facility including a fault communication device for detecting a fault in one or more of said plurality of on-road facilities and, upon detection of a fault in a specific on-road facility, communicating information concerning the detected fault to one or more on-road facilities located upstream from said on-road facility experiencing the fault.

2. The travel supporting road system of claim 1, wherein the driving conditions of the road monitored by said plurality of on-road facilities includes one or more of the following conditions: vehicles on the road, obstacles on the road, and surface conditions of the road.

3. The travel supporting road system according to claim 1, wherein upon a specific on-road facility experiencing a fault, said fault communication device instructs one or more other on-road facilities, located upstream from said specific on-road facility experiencing the fault, to communicate information concerning the fault to those vehicles that may possibly enter a zone monitored by said specific on-road facility experiencing the fault.

4. The travel supporting road system according to claim 1, wherein said fault communication device alerts vehicles that may potentially enter a zone monitored by an on-road facility experiencing a fault by instructing one or more other on-road facilities, located upstream from said on-road facility experiencing the fault, to display information concerning the fault on information display boards.

* * * * *